United States Patent [19]

Languillat

[11] Patent Number: 5,086,677

[45] Date of Patent: *Feb. 11, 1992

[54] TUBE TRUNCATION APPARATUS AND METHOD

[75] Inventor: Jean P. Languillat, Vallieres par Thorigny-sur-Oreuse, France

[73] Assignee: Lhomme S.A., Pont-sur-Yonne, France

[*] Notice: The portion of the term of this patent subsequent to Dec. 26, 2006 has been disclaimed.

[21] Appl. No.: 342,886

[22] Filed: Apr. 25, 1989

Related U.S. Application Data

[63] Continuation-in-part of Ser. No. 924,443, Oct. 29, 1986, Pat. No. 4,889,023.

[30] Foreign Application Priority Data

Apr. 25, 1988 [FR] France ................... 88 05434
Oct. 7, 1988 [FR] France ................... 88 13157

[51] Int. Cl.$^5$ .............................................. B23B 3/04
[52] U.S. Cl. .......................................... 82/92; 82/53.1; 82/54; 82/93; 82/101; 493/288
[58] Field of Search .............. 82/88, 89, 90, 91, 92, 82/93, 94, 95, 101, 102, 53, 47, 56, 57, 58, 59, 82, 83, 84, 85, 53.1; 83/54, 178, 187, 195, 658; 493/288, 289, 290

[56] References Cited

U.S. PATENT DOCUMENTS

| | | |
|---|---|---|
| 2,536,813 | 1/1951 | Jones et al. |
| 2,600,254 | 6/1952 | Lysobey ................... 83/658 |
| 2,607,074 | 8/1952 | Slaughter. |
| 2,699,099 | 1/1955 | Robinson. |
| 3,670,408 | 6/1972 | Sims. |
| 3,933,090 | 1/1976 | Reynolds. |
| 4,299,147 | 11/1981 | Rogers. |
| 4,443,212 | 4/1984 | Mochizuki ................... 493/290 |
| 4,591,405 | 5/1986 | Languillat. |
| 4,645,553 | 2/1987 | Languillat. |
| 4,693,149 | 9/1987 | Sireix. |
| 4,693,919 | 9/1987 | Languillat. |
| 4,713,992 | 12/1987 | Languillat. |
| 4,748,880 | 6/1988 | Languillat. |
| 4,778,440 | 10/1988 | Burchett ................... 493/290 |
| 4,889,023 | 12/1989 | Languillat ................... 82/92 |

FOREIGN PATENT DOCUMENTS

| | | |
|---|---|---|
| 0125175 | 11/1984 | European Pat. Off. |
| 2028522 | 12/1970 | Fed. Rep. of Germany. |
| 1778323 | 9/1971 | Fed. Rep. of Germany. |
| 2015921 | 10/1971 | Fed. Rep. of Germany. |
| 2589384 | 5/1987 | France. |

OTHER PUBLICATIONS

French Search Report 8805434 Along With Its Annex.
A Copy of the French Search Report of French Appln. No. 88 13157.
IBM Technical Disclosure Bulletin, vol. 25, No. 12, May 1983, pp. 6309-6310.

Primary Examiner—Frederick R. Schmidt
Assistant Examiner—Blynn Shideler
Attorney, Agent, or Firm—Sandler, Greenblum & Bernstein

[57] ABSTRACT

The invention relates to a device for truncating tubes, comprising at least one knife, which cooperates at the end of the cut with a counter-knife positioned within the tube to be truncated and which is connected mechanically to a core of strong magnetic permeability. In one embodiment, a winding is wound in a framework around the tube to be truncated, to create a magnetic field in the core through the tube to be truncated so as to be able to act magnetically on the longitudinal position of the core and thus on that of the counter-knife. At least one pair of tubular sleeves are fitted at each of the ends of the framework and are formed of a material of strong magnetic permeability, to direct and form the lines of induction. In another embodiment, the winding is arranged around a core which is fixed with respect to said winding and whose axis is positioned parallel and at a distance from the longitudinal axis of the tube to be truncated. The fixed core is provided at its ends with extensions which extend towards the tube and which have openings for the passage of the tube around two zones which are spaced of a length substantially close to that of a free core, such that the magnetic flux created by the winding can be channeled in the fixed core, the extensions and the free core.

13 Claims, 2 Drawing Sheets

TUBE TRUNCATION APPARATUS AND METHOD

This is a continuation-in-part application of Ser. No. 06/924,443, filed Oct. 29, 1986 now U.S. Pat. No. 4,889,023.

FIELD OF THE INVENTION

The present invention relates to an apparatus and method for truncating tubes.

DESCRIPTION OF BACKGROUND AND RELEVANT MATERIALS

It is known to truncate tubes by means of knives which penetrate through the thickness of the tube when the tube is rotated.

To truncate certain tubes and more particularly tubes made of rigid material, such as cardboard tubes, it is necessary to position within the tube a counterpart on which the knife completes its cuts.

Until the present time, the counterpart was connected mechanically to the exterior by means positioned within the tube so as to ensure the fixed positioning of the counterpart or to permit the longitudinal displacement of the counterpart.

The truncators adapted to cut unitary tubes into a plurality of sections are provided with knives and a longitudinally fixed counterpart, the latter being fitted on a fixed mandrel on which the tube is fitted.

Conversely, in a truncation apparatus for truncating a continuously formed tube, such as a spiraler for a cardboard tube, for example, it is necessary that the one or more knives and the counterpart follow the tube longitudinally in a synchronized manner in the course of manufacture, at the moment of the cut. The knives and the counterpart are then brought back to the initial position after each truncation by a means passing through the winding mandrel of the spiraler.

A mechanical linkage of the counterpart which extends towards the exterior, and which is positioned within the tube, is a true handicap and hinders certain applications.

A means which makes it possible to maintain in position and/or displace the counterpart (hereafter called the counter-knife), without the latter being connected mechanically to an exterior means has been developed. Such a truncating device is the object of parent application Ser. No. 06/924,443 (French Patent No. 2589384) which is hereby incorporated by reference. This device is especially advantageous in that the counter-knife is connected mechanically to a core of strong magnetic permeability, and a magnetic induction means is provided to create a magnetic field in the core through the tube to be truncated so as to be able to act magnetically on the longitudinal position of the core and, thus, on that of the counter-knife as a function of the longitudinal position of the knife.

According to one embodiment, the magnetic induction means comprises a winding wound in a framework around the tube to be truncated, so as to create at least substantially longitudinal lines of induction in the core. Such device is entirely satisfactory. However, the winding needs a cooling device making the assembly very heavy, especially when the tube diameter approaches 200 mm, for example.

In the above-mentioned type of apparatus, the framework is annular and has a central cylindrical part, which is made of a material with weak magnetic permeability (or susceptibility), whereas the ends of the framework comprise, conversely, elements made of material with strong magnetic permeability to direct and form the lines of induction. Thus, the lines of induction pass through the ends and go longitudinally into the core to retain it in place.

It is possible to use a device for each exterior tube diameter or for tubes having reduced diameters. In effect, when the exterior diameter of the tube becomes too small with respect to the interior diameter of the framework, the magnetic flux in the core becomes very small.

SUMMARY OF THE INVENTION

To overcome the above-mentioned problems, one aspect of the invention is to equip the device with at least one pair of tubular sleeves, which are fitted at each end of the framework and which are formed by a material of strong magnetic permeability, the exterior and interior diameters, respectively, of each sleeve being adapted to the interior diameters, respectively, of the elements of the end of the framework, and exterior of the tube to be truncated.

Thus, several pairs of sleeves are provided, whose dimensions are a function of the exterior diameters of the tubes to be truncated, the sleeves being arranged to be able to be removably fixed in position. Therefore, the same apparatus can be used for a large number of different tube diameters. However, an apparatus for a particular diameter can permanently have a single pair of sleeves. Thus, the same machine can be adapted in each case according to the needs of a particular user.

Furthermore, to compensate for the weight of the core, each tubular sleeve has the shape of a circular truncated cylinder, and assembly marks and/or securing means are provided so that the greater longitudinal dimension is positioned towards the upper part and towards the interior of the framework, the circular base which is substantially perpendicular to its longitudinal axis being positioned on the side turned towards the exterior.

In addition, to facilitate the positioning of each sleeve, the section of the sleeves by which the latter are introduced in the framework is slightly beveled towards the longitudinal axis of the sleeves.

In another aspect of the invention, the apparatus is capable of generating a magnetic field adjacent to the tube and then to channel this field towards a free core.

The apparatus according to this invention comprises, like that of application Ser. No. 06/924,443, a winding, but in this device the winding is arranged around a core which is fixed with respect to the winding and whose axis is positioned parallel and at a distance from the longitudinal axis of the tube to be truncated, the fixed core being provided at its ends with extensions which extend towards the tube and which are furnished with openings for the passage of the latter, so that the extensions surround the tube at least in part around the two zones which are spaced by a length substantially approximating that of the free core, such that the magnetic flux created by the winding can be channeled in the fixed core, the extensions and the free core.

According to another embodiment, the fixed core is in the form of a cylinder and its extensions are in the form of plates solid with the cylinder, the plates being positioned along planes which are substantially perpendicular to the axis of the cylinder, where an opening in each plate for the passage of the tube to be truncated, is arranged at its free end and has the shape of a disc opening. The term cylinder should be taken in a broad sense, since it involves preferably a revolving cylinder (the shape of the fixed core depends in fact on that of the winding). The extensions which extend, according to the previously described embodiment, perpendicular to the axis of the core and thus perpendicular to the tube, could of course extend otherwise, for example along the two half-planes of a dihedron which would be close or, conversely, open towards the tube.

Preferably, the fixed core and its extensions are in two parts which are substantially symmetrical and affixed to each other in a detachable manner.

According to the first embodiment, sleeves to adapt the device to various diameters of the tubes to be truncated have been developed. These sleeves are usable in the present embodiment according to the invention where at least one pair of tubular sleeves adapted to be fitted in each of the openings of the extensions of the fixed core and which are formed with a material of strong magnetic permeability, the exterior and interior diameters respectively of each sleeve are adapted to the interior of the openings and exterior of the tube, respectively, to be truncated.

In both embodiments, each tubular sleeve has the shape of a truncated circular cylinder, whereas assembly marks and/or fixation means are provided so that the longitudinal dimension is positioned on the side turned towards the exterior.

According to the invention, there is disclosed an apparatus for truncating tubes, comprising at least one knife adapted to cooperate at the end of the cutting with a counter-knife positioned in the interior of a tube to be truncated, the counter-knife being connected mechanically to a core of strong magnetic permeability, a winding wound in a framework around the tube to be truncated to create a magnetic field in the core through the tube to be truncated as to act magnetically on the longitudinal position of the core and thus on the longitudinal position of the counter-knife, wherein the framework is annular and includes a central cylindrical part comprising a material having weak magnetic permeability, the ends of the framework comprising end elements made of material having strong magnetic permeability to direct and form the lines of induction.

Another aspect of the invention includes at least one pair of tubular sleeves which are fitted at each end of the framework and which are formed by a material of strong magnetic permeability, the exterior and interior diameters respectively of each sleeve being adapted to the respective interior diameter of the end elements of the framework, and the exterior diameter of the tube to be truncated, and wherein a plurality of pairs of sleeves are provided, the dimensions of which are a function of the diameters of the tubes to be truncated, the sleeves being arranged in a manner so as to be able to be removably affixed. Each tubular sleeve is formed in the shape of a circular truncated cylinder, at least one of assembly marks and securing means being provided so that a greater longitudinal dimension is positioned towards a top part and towards the interior of the frame, the circular base substantially perpendicular to its longitudinal axis being positioned on the side turned towards the exterior. The section of a sleeve which is introduced in the framework is slightly beveled towards the longitudinal axis of the sleeve.

In another embodiment of the invention, at least one knife is adapted to cooperate at the end of the cutting with a counter-knife in the interior of a tube to be truncated, the counter-knife being connected mechanically to a free core of strong magnetic permeability, a winding being arranged to create a magnetic field in the free core through the tube to be truncated, so as to act magnetically on the longitudinal position of the free core and thus on the longitudinal position of the counter-knife, the winding being arranged around a core which is fixed with respect to the winding and whose axis is positioned parallel to and spaced from the longitudinal axis of the tube to be truncated, the fixed core being provided at its ends with extensions which extend towards the tube and which are furnished with openings for the passage of the tube, so that the extensions encircle the tube at least in part around two zones which are spaced a length substantially close to that of the free core, whereby the magnetic flux created by the winding is channeled in the fixed core, the extensions and the free core.

In another aspect of the invention, the fixed core is formed in the shape of a cylinder and the extensions are formed in the shape of plates which are solid with the cylinder, the plates being positioned along planes which are substantially perpendicular to the axis of the cylinder, the opening of each plate providing for the passage of the tube to be truncated. The fixed core and the extensions are formed in two substantially symmetrical parts detachably fixed to one another. At least one pair of tubular sleeves are adapted to be fitted in each of the openings of the extensions of the fixed core, the sleeves being formed of a material of strong magnetic permeability, the respective exterior and interior diameters of each sleeve being adapted to the respective interior diameter of the openings and exterior diameter of the tube to be truncated. Each tubular sleeve is formed in the shape of a truncated circular cylinder, at least one of assembly marks and securing means being provided so that a greater longitudinal dimension is positioned upwardly and towards the interior, the circular base substantially perpendicular to its longitudinal axis being positioned on the side turned towards the exterior.

A method of truncating tubes is also disclosed which includes the steps of:

a) supplying a tube to be truncated;

b) truncating the tube with at least one knife adapted to cut through the tube against a counter-knife;

c) positioning the counter-knife within the tube by moving a core of strong magnetic permeability;

d) creating a magnetic field to move the core; wherein the magnetic field has a central portion with relatively weak magnetic permeability and en portions of strong magnetic permeability to direct and form the lines of induction of the magnetic field.

The end portions of strong permeability are formed by fitting sleeves made of a material of strong permeability at the ends of a framework. The magnetic field is created by a winding around the tube to be truncated. The magnetic field can also be created by a winding whose axis is positioned parallel to and spaced from the longitudinal axis of the tube to be truncated.

Another method of truncating tubes includes the steps of:

a) supplying a tube to be truncated;

b) truncating the tube with at least one knife adapted to cut through the tube against a counter-knife;

c) positioning the counter-knife within the tube by moving a free core;

d) arranging a winding and fixed core parallel to and spaced from the longitudinal axis of the tube to be truncated;

e) providing extensions on the ends of the fixed core to at least partially encircle the tube; wherein the magnetic flux created by the winding is channeled in the fixed core, the extensions, and the free core.

BRIEF DESCRIPTION OF THE DRAWINGS

The invention will become clear from the description which follows and which refers to the drawings, in which.

DESCRIPTION OF THE PREFERRED EMBODIMENTS

Figure 1:
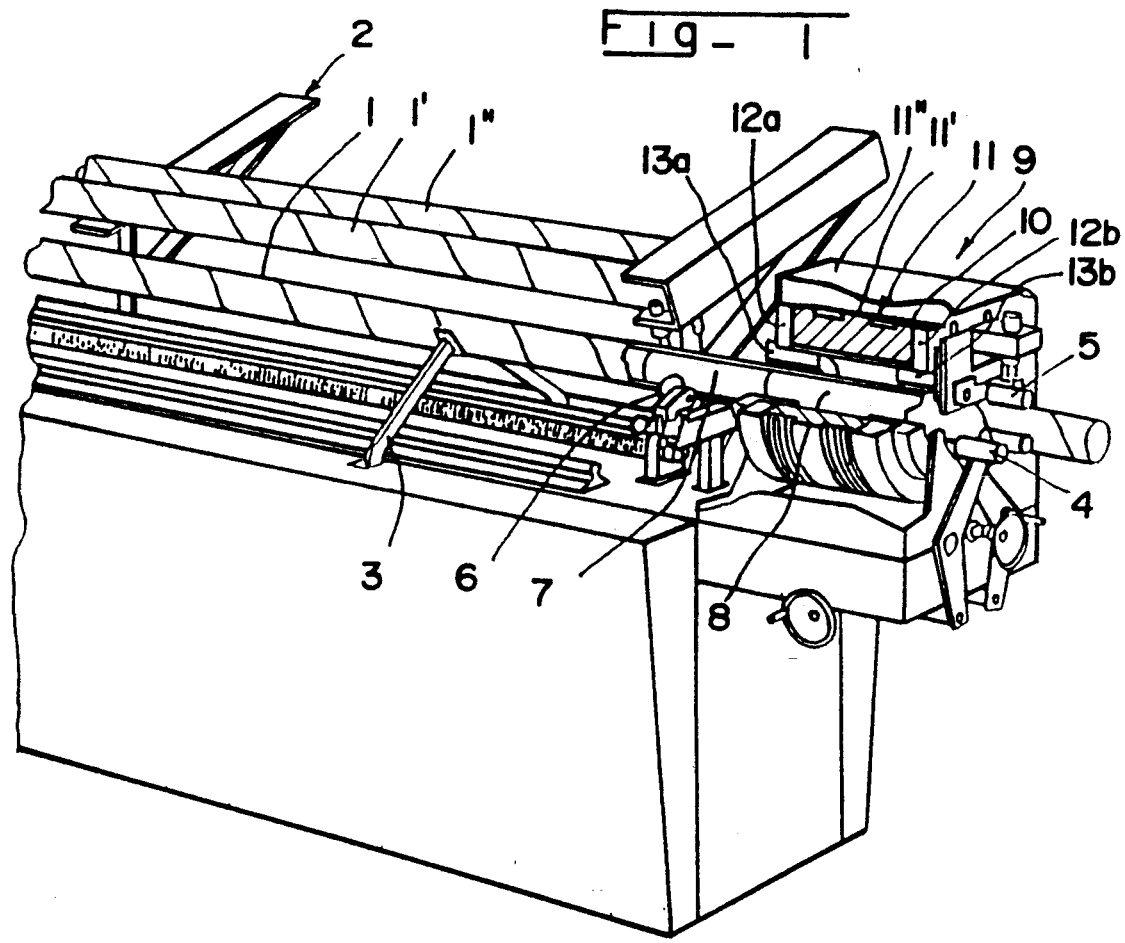
FIG. 1 shows schematically a device according to the invention.

In FIG. 1, a machine adapted to truncate unitary tubes 1, 1', and 1'' is shown. The tubes 1', 1'' are positioned on a distribution or feed apparatus 2 so as to position them successively as the truncating operations progress, the tube 1 is shown ready to be truncated. Tube 1 is guided and centered by means such as the guide 3 and/or the cylinders 4 and 5. Towards the other end of the machine, means (not shown) are provided to push the tubes to be truncated and to rotate them.

To truncate each tube, it is rotated in front of at least one knife 6. Within tube 1 to be truncated, a counterpart or counter-knife 7 is positioned. The counter-knife 7 is connected mechanically to a core of strong magnetic permeability 8, as described in parent application Ser. No. 06/924,443. Core 8 makes it possible to maintain in position the counter-knife 7 with the help of a magnetic induction means 9. The magnetic induction means 9 comprises essentially a winding 10, which is positioned in a framework 11 (an electrical feeding of the winding being provided). As FIG. 1 shows, the winding 10 is positioned so as to encircle the tube 1 to be truncated.

The framework 11, having an annular shape, has a central cylindrical part 11' (i.e., the part nearest tube 1), and an exterior cylindrical envelope or sheath 11''. The central part 11' to be truncated is formed by a material of weak magnetic permeability. On the other hand, the ends of the framework are furnished with rings 12a and 12b of strong magnetic permeability, so as to fully direct the magnetic flux in the core 8.

Figure 2:
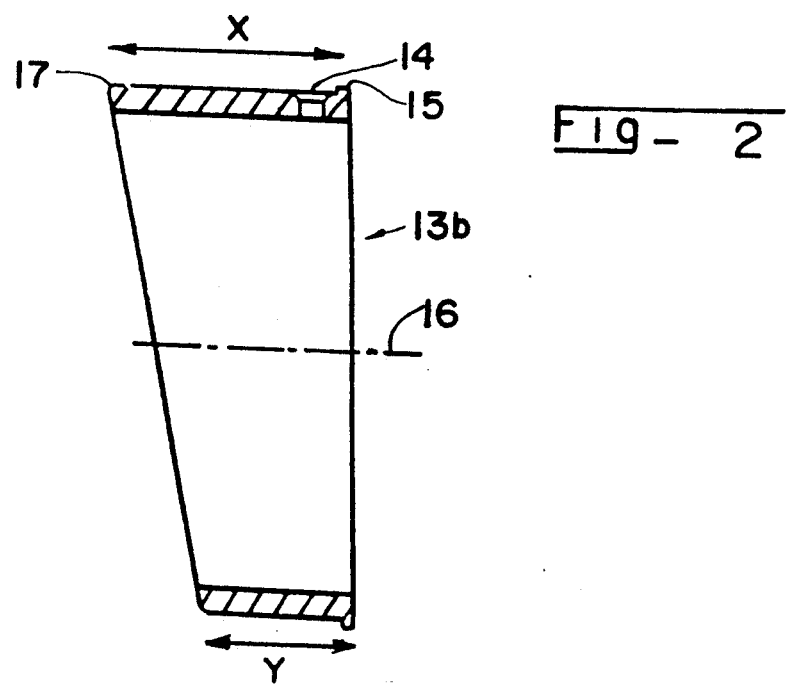
FIG. 2 is an axial cross-section of a sleeve according to the invention.

A pair of tubular sleeves 13a and 13b are shown in FIG. 1, the sleeve 13b being shown in an enlarged manner and in cross-section in FIG. 2. Sleeves 13a and 13b are formed of a material of strong magnetic permeability, in the same manner as the rings 12a and 12b, so as to constitute polar masses. The sleeves 13a and 13b are fitted at two ends of the framework 11, in the rings 12a and 12b, respectively. The diameters of the sleeves are selected in an appropriate manner with respect to the diameters of the rings 12a and 12b and of the exterior diameter of the tube to be truncated, so as to leave the least amount of play possible between the tube and the sleeves (the play apparent in FIG. 1 is slightly exaggerated for better visualization).

As shown in FIG. 2, each sleeve is provided with an opening 14 adapted to receive a pin for securing the sleeve in position, but it is clear that any other means of removably securing is possible. The sleeves have, in addition, a shoulder 15 (FIG. 2), for abutting the framework 11 of the winding.

As also shown in FIG. 2, each sleeve is formed in the shape of a circular truncated cylinder, the circular base substantially perpendicular to the longitudinal axis 16 of the sleeve being adapted to be positioned on the side turned outwardly (i.e., in the position represented in FIG. 2 for the sleeve 13b of FIG. 1). The greater longitudinal dimension X is adapted to be in the top part of the framework (as shown) and the smaller dimension Y, diametrically opposed, is towards the bottom. The positioning is obtained, for example, by the angular position of the opening 14. The sleeve 13a (not shown in FIG. 2) is symmetrical with sleeve 13b with respect to a vertical plane.

As shown in FIG. 2, the frontal section of the sleeve, i.e., the section by which said sleeve is introduced in the machine, has a slight bevel 17, towards the axis 16. The advantages and the uses of sleeves such as 13a and 13b have already been explained above.

The embodiment shown in FIG. 1 can be used with a truncator for unitary tubes, as described in parent application Ser. No. 06/924,443, which describes a truncating device for a continuously manufactured tube. The present invention also applies to the embodiments for continuously manufactured tubes and in which the induction means is either movable or fixed. A movable tubular element around the tube is then provided in the manner described in the parent application. In the latter case (fixed induction means and movable tubular element), the interior diameters of the sleeves take into account the exterior diameter of the tubular element. The linkage between the core 8 and the counter-knife 7 can be of any nature and is, more particularly, as described in the parent application.

Figure 3:
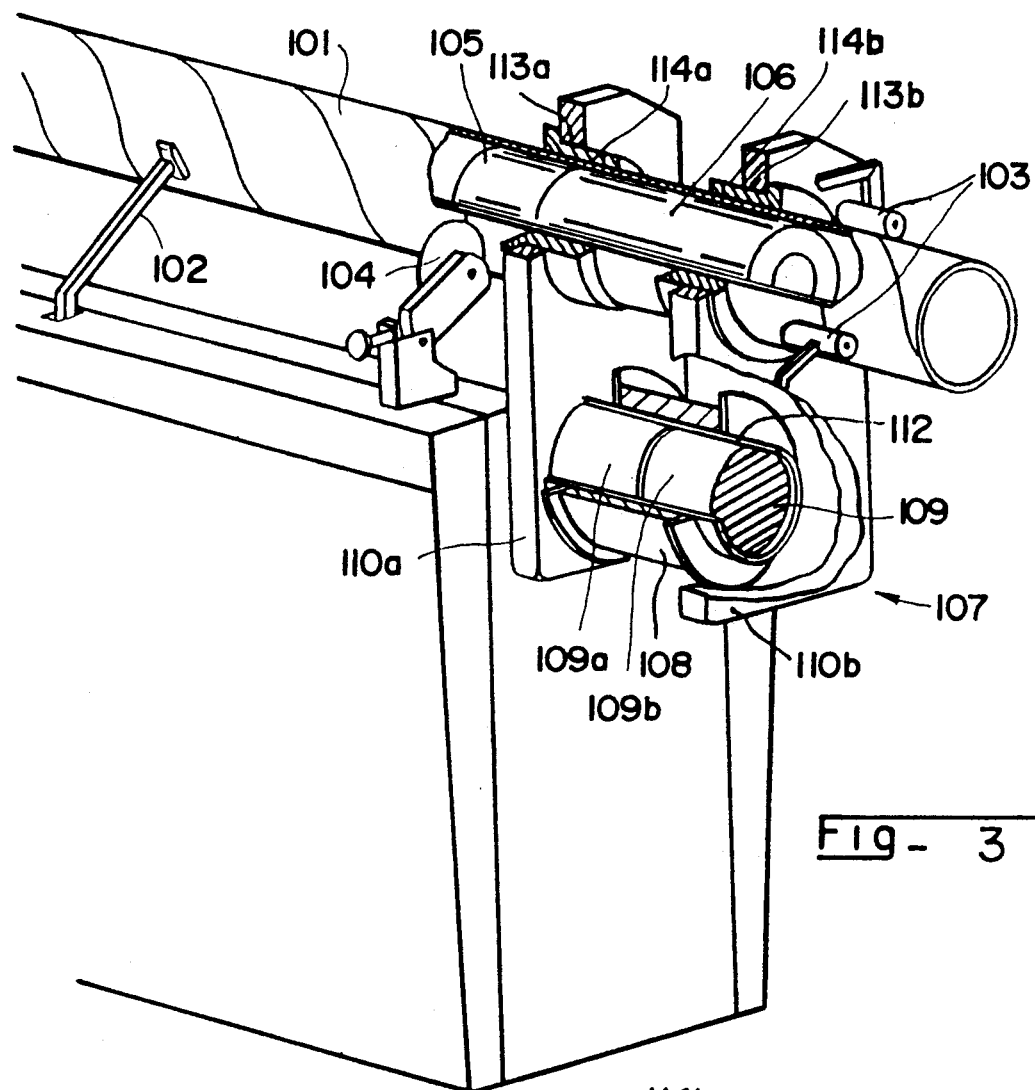
FIG. 3 shows schematically a device of a second embodiment according to the invention.
Figure 4:
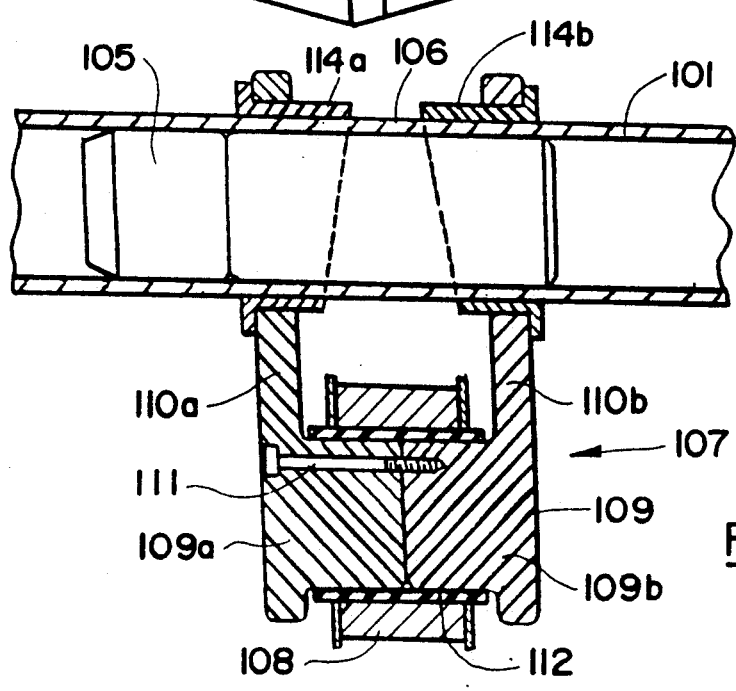
FIG. 4 is an axial cross-section of a portion of the embodiment of FIG. 3.

Another embodiment is shown in FIGS. 3 and 4. In FIG. 3, a machine adapted to truncate unitary tubes is shown, such as the tube 101 in the Figures (machines for the continuous manufacture, will be discussed below).

The tube 101 generally exits from a distribution or feeding apparatus (not shown) and is positioned to be truncated progressively. Tube 101 is guided and centered by means such as the guide 102 and/or the cylinders 103 (FIG. 3). Towards the other end of the machine, means (not shown) are provided to push the tubes to be truncated and to rotate them.

In effect, to truncate each tube, the tube is rotated before at least one knife 104. Within the tube 101 to be truncated, a counterpart or counter-knife 105 is positioned. The counter-knife 105 is connected mechanically to a core 106 of strong magnetic permeability, as described in the parent application and the embodiment of FIGS. 1 and 2. The core 106 makes it possible to maintain the counter-knife 105 in position with the help of a magnetic induction means 107.

The core 106 is free, although connected to the counter-knife 105, in the sense that in the absence of a magnetic field, it is positioned freely in the tube 101 and, therefore, is called hereafter, a free core. However, it is understood that the core can be completely solid with the counter-knife, or have one or two degrees of freedom (rotation and/or translation) with respect to the counter-knife.

The magnetic induction means 107 comprises a winding 108 which is fed electrically. However, where the winding provided in the parent application and the embodiment of FIGS. 1 and 2 encircles the tube 101, the winding 108 encircles here an insulator 112 forming in a part a framework for the winding. A fixed core 109 of soft iron, for example, in a cylindrical shape has an axis which is parallel to and spaced from the axis of the tube 101.

The core 109 is provided with two extensions 110a, 110b, which extend, in this embodiment, radially towards the tube 101, (i.e., according to the planes perpendicular to the axis of said core) as shown in FIGS. 3 and 4.

In fact, the core 109 is in two parts 109a and 109b, each being solid, respectively, with extension 110a, 110b, such that one has two parts which are substantially symmetrical. 109a, 110a and 109b, 110b are affixed to one another, for example in a detachable manner by a screw 111, as shown in FIG. 4.

The extensions 110a and 110b are each provided with an opening 113a, 113b (FIG. 3) in the shape of a disc for the passage of the tube 101 and the introduction of a sleeve which will be discussed below.

As the drawings show, the openings of the extensions 110a, 110b are constructed so that the extensions completely encircle the tube 101. However, each opening could be in the shape, for example, of a half or three-quarters disc such that each extension encircles only partially the tube 101.

As shown in FIG. 3 and 4, in each opening 113a, 113b, is fitted a sleeve, respectively, 114a, 114b, of strong magnetic permeability. The diameters of the sleeves are selected in an appropriate manner with respect to the diameters of the openings 113a and 113b and of the exterior diameter of the tube to be truncated. The sleeves 114a, 114b, each have a shoulder 115a, 115b which are adapted to abut extensions of plates 110a, 110b.

As the Figures also show, and in particular FIG. 4, each sleeve is in the shape of a truncated circular cylinder, the circular base substantially perpendicular to the longitudinal axis of the sleeve being adapted to be positioned on the side turned towards the exterior, as shown. The greater longitudinal dimension is adapted to be the top part of the corresponding opening, and the smaller dimension diametrically opposed is towards the lower part. Assembly marks and/or securing means are provided.

The advantages and the uses of sleeves such as 114a, 114b have been described in the description of the embodiment of FIGS. 1 and 2. Several pairs of sleeves 114a, 114b make it possible in effect to adapt the device to various diameters of tubes to be truncated, by reducing the play between said sleeves and the tube.

The spacing of the extensions 113a, 113b is close enough to the actual length of the free core 106. Thus, it is understood that the magnetic flux created by the winding 108 is channeled in the fixed core 109, the extensions 110a, 110b, the sleeves 114a, 114b and free core 106.

Finally, this embodiment can be used with a truncator for unitary tubes, and as described in the parent application, a truncating device for continuously manufactured tubes can also be applied to the embodiments for continuously manufactured tubes in which the induction means is either movable or fixed. In the latter case, a tubular movable element around the tube is then provided in the manner described in the parent application. Still, in the case of the fixed induction means with the movable tubular element, the interior diameters of the sleeves will take into account the exterior diameter of the tubular element.

It should be noted that the invention relates principally, but not exclusively, to tubes made out of cardboard.

Furthermore, the tubes can have a circular or polygonal cross-section. In the latter case, the rotational means provided can, for example, be replaced by a rotatably mounted pusher.

Additionally, although the invention has been described with reference to particular means, materials and embodiments, it is to be understood that the invention is not limited to the particulars disclosed and extends to all equivalents within the scope of the claims.

I claim:

1. An apparatus for truncating tubes, comprising at least one knife adapted to cooperate at the end of the cutting with a counter-knife positioned in the interior of a tube to be truncated, said counter-knife being connected mechanically to a core of strong magnetic permeability, a winding wound in a framework around the tube to be truncated to create a magnetic field in said core through the tube to be truncated as to act magnetically on the longitudinal position of said core and thus on the longitudinal position of the counter-knife, wherein said framework is annular and includes a central cylindrical part comprising a material having weak magnetic permeability, the ends of said framework comprising end elements made of material having strong magnetic permeability to direct and form the lines of induction, and comprising at least one pair of tubular sleeves which are fitted at each end of the framework and which are formed by a material of strong magnetic permeability, the exterior and interior diameters respectively of each sleeve being adapted to the respective interior diameter of said end elements of the framework, and the exterior diameter of the tube to be truncated.

2. The apparatus according to claim 1, wherein the section of a sleeve which is introduced in the framework is slightly beveled towards the longitudinal axis of said sleeve.

3. The apparatus according to claim 1, wherein a plurality of pairs of sleeves are provided, the dimensions of which are a function of the diameters of the tubes to be truncated, said sleeves being arranged in a manner so as to be able to be removably affixed.

4. The apparatus according to claim 1, wherein each tubular sleeve is formed in the shape of a circular truncated cylinder, at least one of assembly marks and securing means being provided so that a greater longitudinal dimension is positioned towards a top part and towards the interior of the frame, the circular base substantially perpendicular to its longitudinal axis being positioned on the side turned towards the exterior.

5. A method of truncating tubes comprising the steps of:
 a) supplying a tube to be truncated;
 b) truncating said tube with at least one knife adapted to cut through said tube against a counter-knife;
 c) positioning said counter-knife within said tube by moving a free core;
 d) arranging a winding and fixed core parallel to and spaced from the longitudinal axis of the tube to be truncated;
 e) providing extensions on the ends of said fixed core, said extensions extending towards said tube to at least partially encircle said tube; wherein the magnetic flux created by the winding is channeled in the fixed core, the extensions, and the free core.

6. An apparatus for truncating tubes, comprising at least one knife adapted to cooperate at the end of the cutting with a counter-knife in the interior of a tube to be truncated, said counter-knife being connected mechanically to a free core of strong magnetic permeability, a winding being arranged to create a magnetic field in said free core through the tube to be truncated, so as to act magnetically on the longitudinal position of said free core and thus on the longitudinal position of the counter-knife, said winding being arranged around a core which is fixed with respect to said winding, the longitudinal axis of said core being positioned parallel to and spaced from the longitudinal axis of the tube to be truncated, said fixed core being provided at its ends with extensions which extend towards said tube, from the longitudinal axis of said core, and which are furnished with openings for the passage of the tube, so that said extensions encircle said tube at least in part around two zones which are spaced a length substantially close to that of the free core, whereby the magnetic flux created by the winding is channeled in the fixed core, said extensions and the free core.

7. The apparatus according to claim 6, wherein said fixed core is formed in the shape of a cylinder and said extensions are formed in the shape of plates which are solid with said cylinder, said plates being positioned along planes which are substantially perpendicular to the axis of said cylinder, the opening of each plate providing for the passage of the tube to be truncated.

8. The apparatus according to claim 7, comprising at least one pair of tubular sleeves adapted to be fitted in each of the openings of said extensions of the fixed core, said sleeves being formed of a material of strong magnetic permeability, the respective exterior and interior diameters of each sleeve being adapted to the respective interior diameter of the openings and exterior diameter of the tube to be truncated.

9. The apparatus according to claim 8, wherein each tubular sleeve is formed in the shape of a truncated circular cylinder, at least one of assembly marks and securing means being provided so that a greater longitudinal dimension is positioned upwardly and towards the interior, the circular base substantially perpendicular to its longitudinal axis being positioned on the side turned towards the exterior.

10. The apparatus according to claim 6, wherein said fixed core and said extensions are formed in two substantially symmetrical parts detachably fixed to one another.

11. A method of truncating tubes comprising the steps of:
   a) supplying a tube to be truncated;
   b) truncating said tube with at least one knife adapted to cut through said tube against a counter-knife;
   c) positioning said counter-knife within said tube by moving a core of strong magnetic permeability;
   d) creating a magnetic field to move said core; wherein the magnetic field has a central portion with relatively weak magnetic permeability and end portions of strong magnetic permeability to direct and form the lines of induction of magnetic field, wherein said end portions of strong permeability are formed by fitting sleeves made of a material of strong permeability at the ends of a framework.

12. The method according to claim 11, and further comprising creating said magnetic field by a winding whose axis is positioned parallel to and spaced from the longitudinal axis of the tube to be truncated.

13. The method according to claim 11, and further comprising creating said magnetic field by a winding around the tube to be truncated.

* * * * *